(12) United States Patent
Yaji

(10) Patent No.: US 7,710,601 B2
(45) Date of Patent: May 4, 2010

(54) IMAGE FORMING APPARATUS

(75) Inventor: Masao Yaji, Tokyo (JP)

(73) Assignee: OKI Data Corporation, Tokyo (JP)

( * ) Notice: Subject to any disclaimer, the term of this patent is extended or adjusted under 35 U.S.C. 154(b) by 555 days.

(21) Appl. No.: 11/525,825

(22) Filed: Sep. 25, 2006

(65) Prior Publication Data

US 2007/0171478 A1    Jul. 26, 2007

(30) Foreign Application Priority Data

Sep. 27, 2005    (JP) ............................. 2005-280596

(51) Int. Cl.
*H04N 1/60* (2006.01)
*G06F 3/12* (2006.01)

(52) U.S. Cl. ...................................... 358/1.9; 358/1.1

(58) Field of Classification Search ................. 358/1.9, 358/1.26, 3.26, 3.01, 3.06, 3.13, 3.14, 3.24, 358/1.1, 1.2, 1.3, 1.4, 1.5, 1.7, 1.8, 534, 535, 358/536, 502, 1.6, 518, 474, 475; 382/162, 382/237, 238, 239, 247, 193, 169; 347/1, 347/2, 3, 5, 10, 11, 12, 13, 14, 23, 117, 118, 347/119, 129, 130, 131, 132, 135, 224, 225, 347/238; 399/1, 4, 8, 9, 38

See application file for complete search history.

(56) References Cited

U.S. PATENT DOCUMENTS

| | | | | | |
|---|---|---|---|---|---|
| 4,897,672 | A | * | 1/1990 | Horiuchi et al. | 347/236 |
| 5,253,934 | A | * | 10/1993 | Potucek et al. | 347/237 |
| 5,739,841 | A | * | 4/1998 | Ng et al. | 347/237 |
| 6,268,878 | B1 | * | 7/2001 | Yajima et al. | 347/247 |
| 6,795,217 | B1 | * | 9/2004 | Mikami | 358/3.26 |
| 7,110,128 | B1 | * | 9/2006 | Kaburagi et al. | 358/1.15 |
| 2004/0042816 | A1 | * | 3/2004 | Fukuda et al. | 399/98 |

FOREIGN PATENT DOCUMENTS

JP    08-142406    6/1996

* cited by examiner

*Primary Examiner*—Dov Popovici
(74) *Attorney, Agent, or Firm*—Rabin & Berdo, P.C.

(57) ABSTRACT

A pseudo random number generating circuit forms uniform distribution random number noises. An insertion noise data forming unit receives the uniform distribution random number noises, center-distributes them around 0 as a center, further reads out output correction values of every recording device from an LED characteristics variation data memory, center-distributes them on the basis of the output correction values, and outputs them. A noise inserting circuit receives an output of the insertion noise data forming unit and adds it to input image data. The occurrence a stripe-shaped concentration variation on an output image is prevented, so that a good output image is obtained.

17 Claims, 17 Drawing Sheets

| CORRECTION IMAGE DATA | EXPOSING ENERGY |
|---|---|
| 0 0 | 0 8 |
| 0 1 | 0 b |
| 0 2 | 0 c |
| 0 3 | 0 d |
| 0 4 | 0 e |
| 0 5 | 0 f |
| 0 6 | 1 1 |
| 0 7 | 1 2 |
| ⋮ | ⋮ |
| 3 e | f a |
| 3 f | f f |

IMAGE FORMING APPARATUS

BACKGROUND OF THE INVENTION

1. Field of the Invention

The invention relates to an image forming apparatus such as printer, facsimile, copying apparatus, or the like or an image forming apparatus such as an MFP (Multi Function Printer) or the like having at least two or more functions of those apparatuses or the like.

2. Description of the Related Art

Among image forming apparatuses represented by a printer, there is an apparatus having a recording head in which recording devices such as exothermic resistor elements, light emitting devices, or the like are arranged in a line or a plurality of lines. In such an image forming apparatus, an image is formed by selectively supplying a current to those recording devices. In the recording head which is used in the image forming apparatus, it is important that characteristics of the arranged recording devices are identical. This is because, for example, in an image forming apparatus using LEDs (light emitting diodes) as light emitting devices which are used in a printer of an electrophotographic system or the like, if light emitting energies of the LEDs to which the same current has been supplied are equal, a uniform image without a deviation which depends on layout positions of the LEDs is obtained. However, it is generally difficult to manufacture the recording devices whose characteristics coincide accurately. Therefore, a characteristics variation of the recording devices is corrected, for example, in the case of the light emitting devices, the energy for recording is corrected by changing a light emitting time or a drive current value (for example, refer to JP-A-1996(Heisei-8)-142406).

A problem to be solved is as follows. In the above energy correction, it is difficult to continuously and smoothly change energy distribution in the scanning direction, and discontinuous points of the energy distribution are liable to occur between the adjacent recording devices. Such discontinuous points are accumulated in dependence on human visual characteristics and appears as a stripe-shaped concentration variation which continues in the sub-scanning direction on an output image.

SUMMARY OF THE INVENTION

It is an object of the invention to prevent the occurrence of the stripe-shaped concentration variation and obtain a good output image in an image forming apparatus such as printer, facsimile, copying apparatus, or the like, an MFP having at least two or more functions of those apparatuses or the like.

According to the present invention, there is provided an image forming apparatus for making output correction of every plural recording devices arranged on scanning lines to an input image signal, comprising a correction amount calculating unit which calculates a predetermined correction amount; and a correction amount inserting unit which arithmetically operates the correction amount calculated by the correction amount calculating unit to the input image signal.

Moreover, in the image forming apparatus, the correction amount may be calculated by using a predetermined value as a reference.

Moreover, the image forming apparatus may further comprise a series forming unit which forms series numbers by using the predetermined value as a reference.

Moreover, in the image forming apparatus, the predetermined value may be substantially equal to 0.

Moreover, in the image forming apparatus, the correction amount may be a value obtained by averaging the series numbers formed by the series forming unit.

Moreover, in the image forming apparatus, the series numbers may be pseudo random numbers.

Moreover, in the image forming apparatus, the pseudo random numbers may be uniform distribution random numbers or normal distribution random numbers.

Moreover, the image forming apparatus may further comprise an output speed raising means which synthesizes an output of the pseudo random numbers into a plurality of bits and a plurality of words and outputs them.

Moreover, the image forming apparatus may further comprise a center distributing means which receives the pseudo random numbers, arithmetically operates a predetermined bias value to the pseudo random numbers, center-distributes the pseudo random numbers around 0 as a center, and outputs them.

Moreover, the image forming apparatus may further comprise a variation correcting means which makes correction of the bias value to the center-distributed pseudo random numbers which are outputted by the center distributing means on the basis of an output correction value of each of the recording devices.

Moreover, the image forming apparatus may further comprise an exposing means as image forming means.

Moreover, in the image forming apparatus, the exposing means may be an LED device.

According to the invention, as noises which are added to the image data outputted every recording device, uniform distribution random number noises in which a predetermined bias value is added to a noise level and the noise level has been center-distributed around 0 as a center or normal distribution noises are used, so that an average concentration of the noises which are added approaches 0. Consequently, such an effect that the slight image change which has occurred in the related art does not occur is obtained.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

A noise forming unit is realized by an M series (Maximum Length Code) pseudo random number circuit construction having a characteristics polynomial $$X^{24}=1+X+X^2+X^7.$$

Embodiment 1

Figure 1:
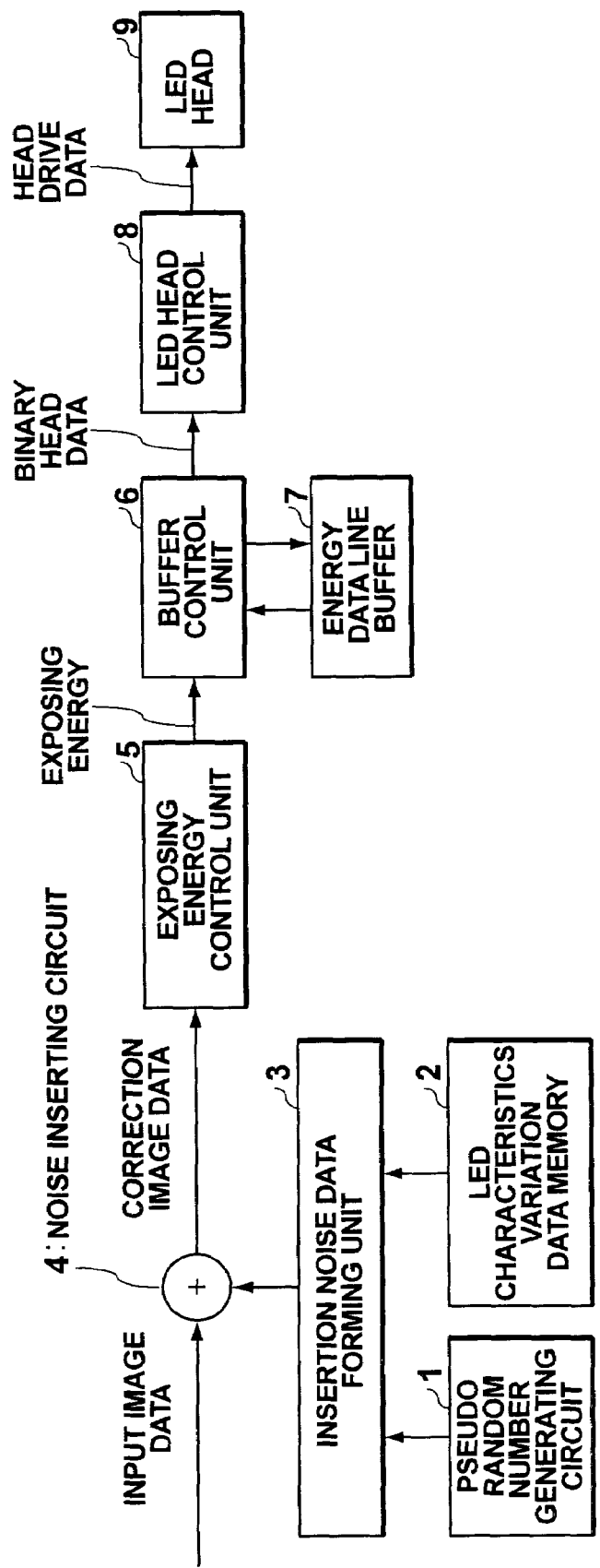
FIG. 1 is a block diagram of a construction of an image forming apparatus according to an embodiment 1.

FIG. 1 is a block diagram of a construction of an image forming apparatus according to an embodiment 1.

As shown in the diagram, an image forming apparatus 100 according to the embodiment 1 has: a pseudo random number generating circuit 1; an LED characteristics variation data memory 2;

an insertion noise data forming unit 3; a noise inserting circuit 4; an exposing energy control unit 5; a buffer control unit 6; an energy data line buffer 7; an LED head control unit 8; and an LED head 9.

The pseudo random number generating circuit 1 is a circuit to form noises which are inserted into input image data which is transmitted from an upper apparatus (not shown).

Figure 2:
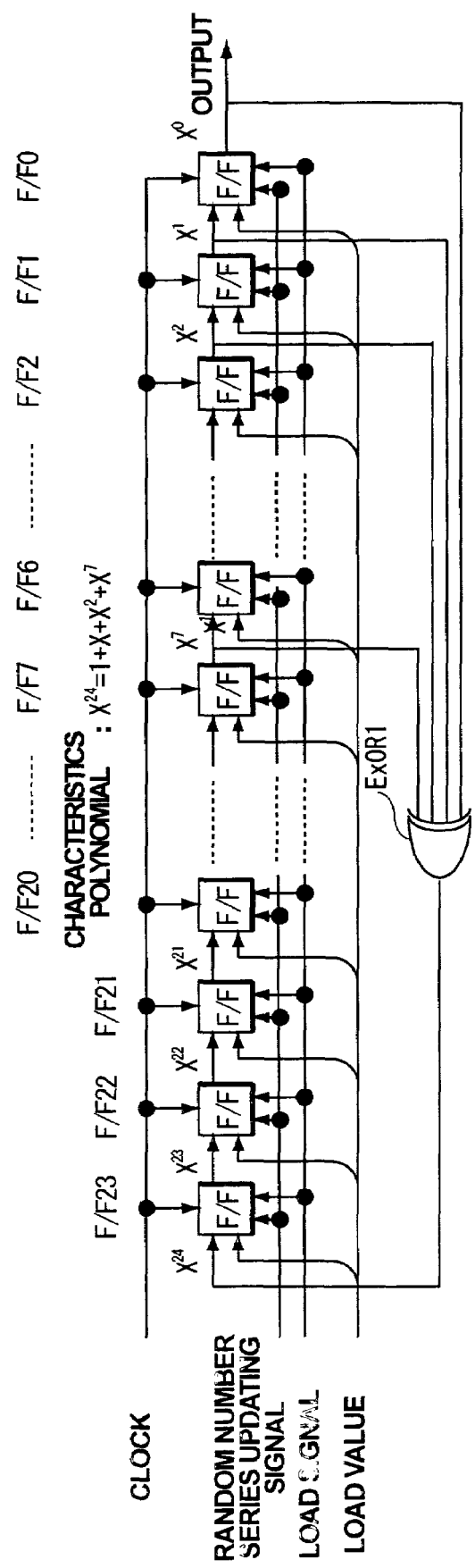
FIG. 2 is a constructional diagram of a pseudo random number generating circuit in the embodiment 1.

FIG. 2 is a constructional diagram of the pseudo random number generating circuit in the embodiment 1.

As shown in the diagram, the pseudo random number generating circuit 1 in the embodiment is an M series pseudo random number generating circuit comprising: 24 shift registers F/F0 to F/F23; and an adder ExOR1.

The 24 shift registers F/F0 to F/F23 sequentially transfer data from the left to the right in the diagram synchronously with clocks. The adder ExOR1 adds (exclusive OR) outputs of the shift registers F/F7, F/F2, F/F1, and F/F0 and returns an addition output to the shift register F/F23. Such a construction is expressed by the characteristics polynomial $$X^{24}=1+X+X^2+X^7$$

It has been known that when $X^0$ in the diagram is assumed to be an output of one bit, pseudo random numbers (uniform random numbers) having a period of $2^{24-1}$ are formed.

Returning to FIG. 1, the LED characteristics variation data memory 2 is a non-volatile memory to hold correction values for correcting a characteristics variation of LED devices arranged on scanning lines in correspondence to the respective LED devices. The correction values are data values for correcting the characteristics variation of the LED devices by changing, for example, a drive current value in order to obtain a uniform image without a deviation which depends on the layout positions of the LED devices.

The insertion noise data forming unit 3 is a portion for receiving an output of the pseudo random number generating circuit 1, reading out the correction values from the LED characteristics variation data memory 2, and forming insertion noise data to be inserted into the input image data. Contents of such an operation will be described in detail hereinbelow.

Figure 3:
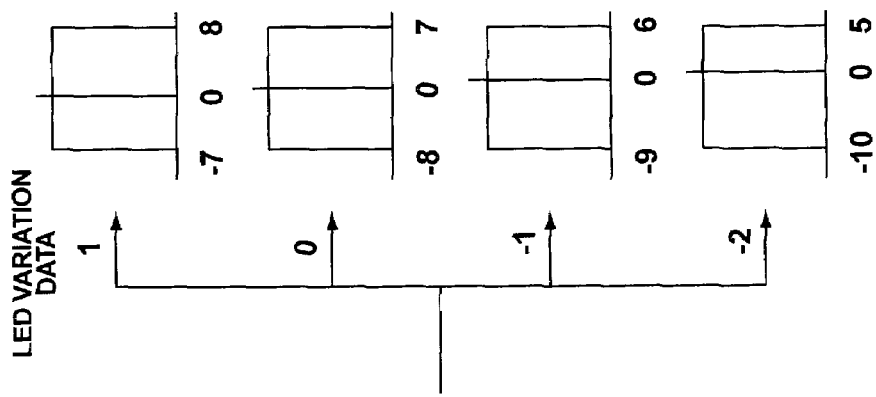
FIGS. 3A to 3C are explanatory diagrams of functions of an insertion noise data forming unit in the embodiment 1.

FIGS. 3A to 3C are explanatory diagrams of functions of the insertion noise data forming unit in the embodiment 1.

FIG. 3A shows a relation between a noise level and an appearance frequency of the pseudo random numbers inputted to the insertion noise data forming unit. FIG. 3B shows the state where a bias of −8 has been added to the noise level in FIG. 3A. FIG. 3C shows the state where the noise level in FIG. 3B has been corrected in accordance with the variation of the LED devices.

Assuming that there is no variation of the LED devices, if the random number noises expressed by the distribution of FIG. 3B are inserted as they are into the input image data, an average level of the random number noises is equal to 0 every predetermined period. Therefore, a difference between an average concentration of every scanning line (which may be replaced by a plurality of scanning lines) only by the input image data and an average concentration of the scanning line (which may be replaced by a plurality of scanning lines) in the case where the random number noises have been inserted ought to be able to be ignored. That is, the state where the image is slightly changed ought not to occur.

However, there is actually the characteristics variation of the LED devices. The characteristics variation becomes a variation of the light emitting energies and breaks the foregoing ideal state. Thus, it is necessary to correct the characteristics variation of the LED devices. As a method of correcting such a variation, for example, the variation level of all of the LED devices is divided into four levels (1, 0, −1, −2) in order to correct the variation. The state where the bias has been corrected every level-divided LED in order to correct the output light energies of the level-divided LEDs becomes an appearance frequency shown in FIG. 3C. That is, the random number noises of the appearance frequency shown in FIG. 3C are selected in accordance with each level (in accordance with the characteristics variation) and inserted to each of the level-divided LEDs. Thus, the correction of the output light energies of the input image data is executed every LED device. The difference between the average concentration of every scanning line (which may be replaced by a plurality of scanning lines) only by the input image data and the average concentration of the scanning line (which may be replaced by a plurality of scanning lines) in the case where the random number noises have been inserted can be ignored.

Figure 4:
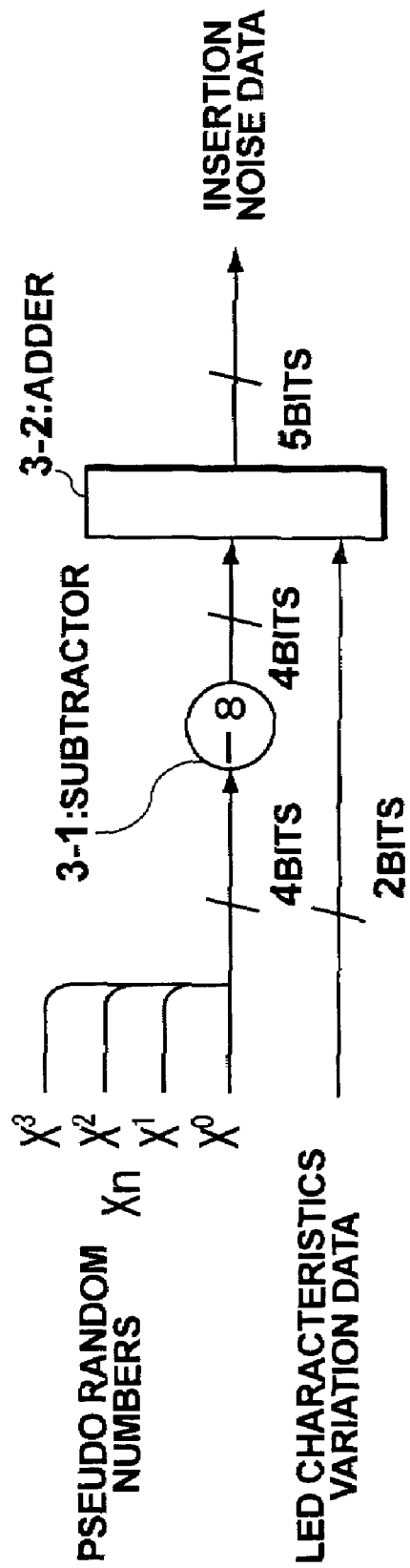
FIG. 4 is a constructional diagram of the insertion noise data forming unit.

FIG. 4 is a constructional diagram of the insertion noise data forming unit.

Referring to FIG. 4, the insertion noise data forming unit 3 has a subtractor 31 and an adder 32. Pseudo random numbers Xn of 4 bits and 16 levels (corresponding to FIG. 3A) are inputted to the subtractor 31. The bias of −8 is added (corresponding to FIG. 3B) to the noise level of the pseudo random numbers of 4 bits and 16 levels by the subtractor 31. Further, LED characteristics variation data (level correction data) of 2 bits and 4 levels (1, 0, −1, −2) is inputted from the LED characteristics variation data memory 2. The LED characteristics variation data and an output of the subtractor 31 are added by the adder 32 and addition data is outputted (corresponding to FIG. 3C).

Figure 5:
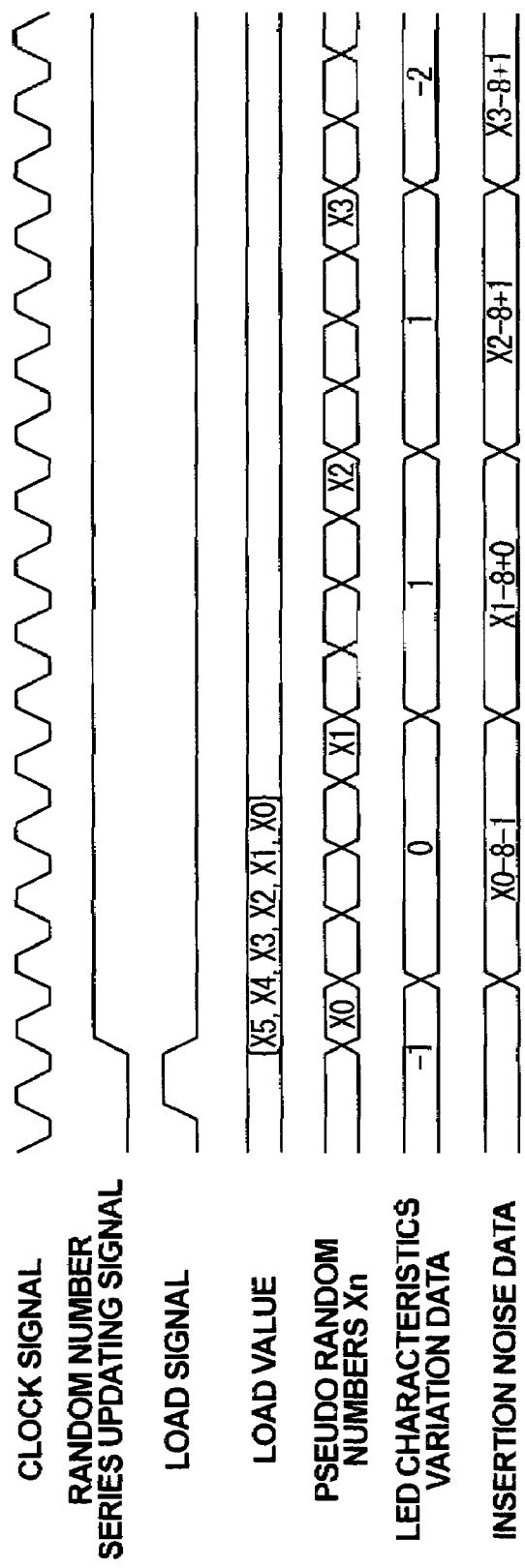
FIG. 5 is an explanatory diagram of the operation of the insertion noise data forming unit in the embodiment 1.

FIG. 5 is an explanatory diagram of the operation of the insertion noise data forming unit in the embodiment 1.

In the direction of an axis of ordinate in the diagram, a clock signal, a random number series updating signal, a load signal, a load value, the pseudo random numbers Xn, LED characteristics variation data, and insertion noise data are shown in order from the top. An axis of abscissa in the diagram indicates a time base which is common to those signals. In the diagram, for a period of time during which the random number series updating signal has been asserted, the valid pseudo random numbers are received every four clocks from the pseudo random number generating circuit (FIG. 2). The pseudo random numbers Xn are inputted to the subtractor 31 in FIG. 4.

As shown in the diagram, the LED characteristics variation data is inputted every 4 bits to the adder 3-2 (FIG. 4) synchronously with the pseudo random numbers Xn in order of level −1, level 0, level 1, and level 1 and, at the same time, the insertion noise data (X0−8−1, X1−8+0, X2−8+1, X3−8+1) is outputted.

Returning to FIG. 1, the noise inserting circuit 4 is a circuit for receiving the insertion noise data from the insertion noise data forming unit 3, adding it to the input image data, and outputting the correction image data to the exposing energy control unit 5. That is, the noise inserting circuit 4 inserts the insertion noise data of 5 bits received from the insertion noise data forming unit 3 into the input image data of 6 bits received from the upper apparatus (not shown) and outputs resultant data as correction image data of 6 bits.

The exposing energy control unit 5 is a portion for receiving the correction image data from the noise inserting circuit 4 and outputting the exposing energy corresponding to the correction image data to the buffer control unit 6.

Figures 6A, 6B:
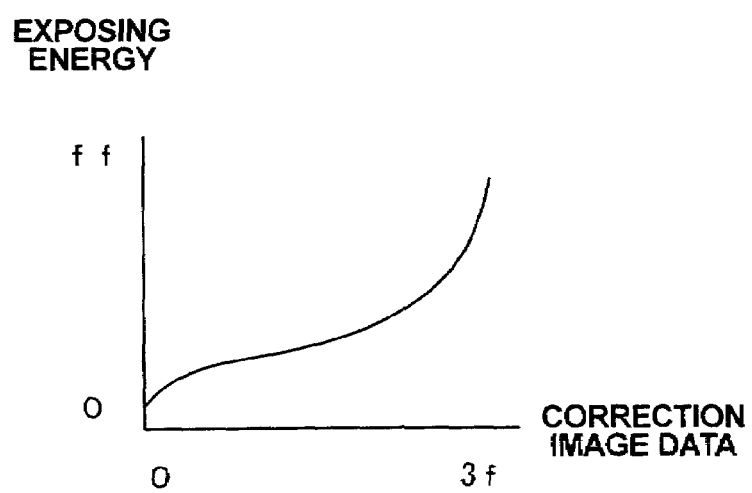
FIGS. 6A and 6B are explanatory diagrams of functions of an exposing energy control unit.

FIGS. 6A and 6B are explanatory diagrams of functions of the exposing energy control unit.

FIG. 6A shows contents of an LUT (lookup table). FIG. 6B shows converting characteristics for converting from the correction data into the exposing energy.

As shown in FIG. 6A, the LUT (lookup table) is a table in which a data value of the correction image data of 6 bits is used as an address and the exposing energy value of 8 bits corresponding to the correction image data value is stored. The LUT (lookup table) has previously been stored in a ROM (not shown) for storing a control program for controlling the whole apparatus. For example, as shown in an example in FIG. 6B, the exposing energy value has been preset in such a manner that a photosensitive drum is exposed by an LED head having standard characteristics and an optical concentration on a medium which is obtained through developing, transferring, and fixing processes becomes linear to the correction image data.

Returning to FIG. 1, the buffer control unit 6 is a portion for receiving the exposing energy value from the exposing energy control unit 5 and outputting binary head data converted into a predetermined format to the LED head control unit 8 at predetermined timing.

Figure 7:
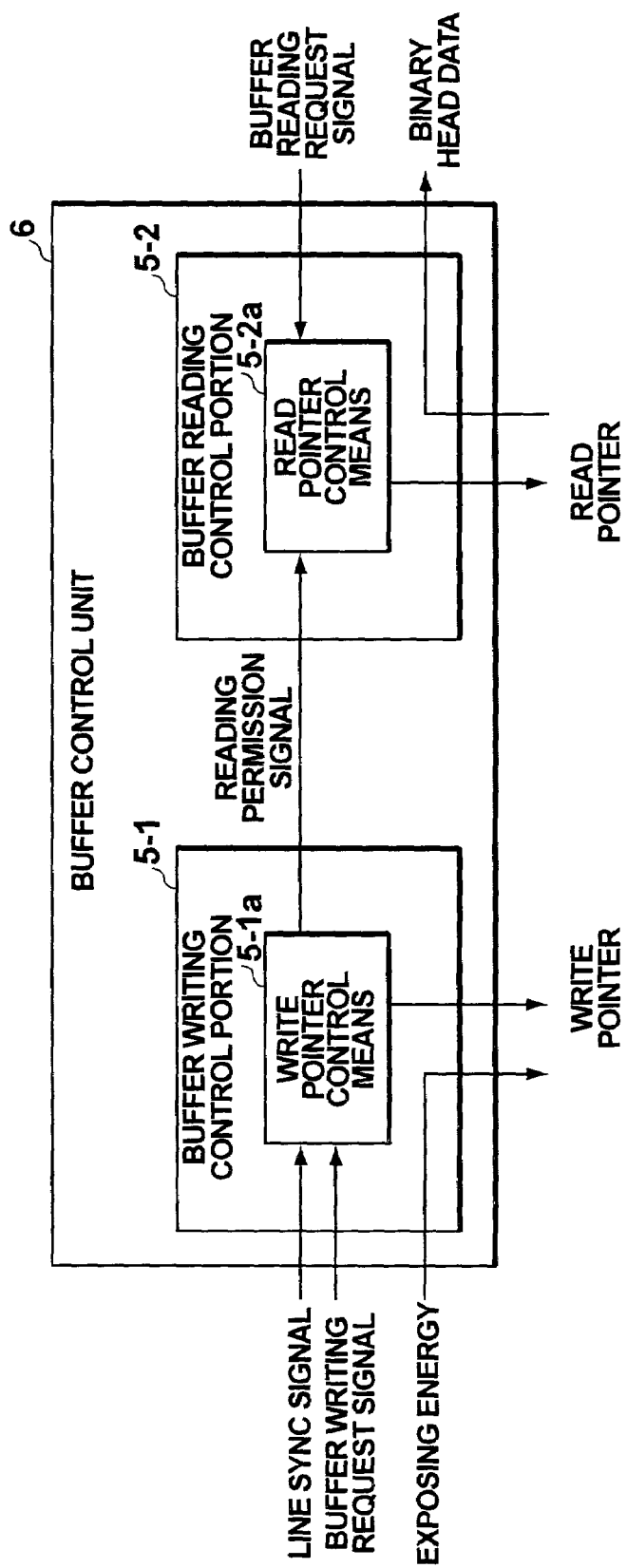
FIG. 7 is a block diagram of a construction of a buffer control unit.

FIG. 7 is a block diagram of a construction of the buffer control unit.

As shown in the diagram, the buffer control unit 6 has a buffer writing control portion 5-1 and a buffer reading control portion 5-2. The buffer writing control portion 5-1 controls write pointer control means 5-1a provided therein and controls data writing into the energy data line buffer 7. The buffer reading control portion 5-2 controls read pointer control means 5-2a provided therein and controls data reading from the energy data line buffer 7.

Returning to FIG. 1, the energy data line buffer 7 is a memory for storing the exposing energy value which is inputted from the exposing energy control unit 5 to an address which is designated by the write pointer control means 5-1a. The energy data line buffer 7 is also a memory in which the binary head data is read out from an address which is designated by the read pointer control means 5-2a.

Figure 8:
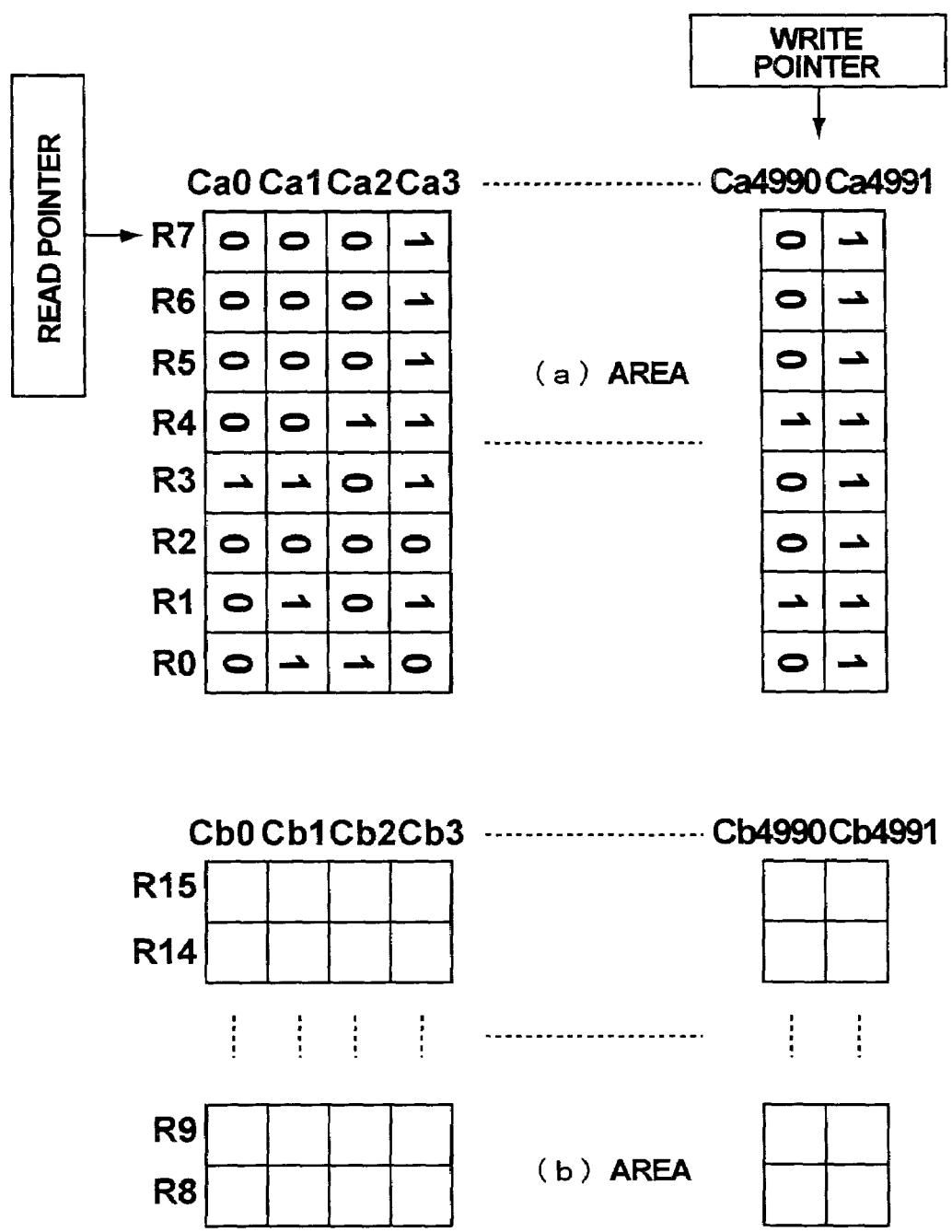
FIG. 8 is an explanatory diagram of a construction of an energy data line buffer and a function of the buffer control unit.

FIG. 8 is an explanatory diagram of a construction of the energy data line buffer and a function of the buffer control unit.

As shown in the diagram, the energy data line buffer is a memory having the following two series of areas: an (a) area having 4992 (which is equal to the number of LED devices of the LED head mounted in the apparatus) column addresses Ca0 to Ca4991 and eight row addresses R7 to R0; and a (b) area having 4992 column addresses Cb0 to Cb4991 and eight row addresses R15 to R8. By alternately using those areas, the writing and reading operations can be simultaneously executed.

When a buffer writing request signal is inputted and the writing is started, the write pointer control means 5-1a designates the column address Ca0 in the (a) area under the control of the buffer writing control portion 5-1 (FIG. 7). At this time, the 8-bit exposing energy value which is received from the exposing energy control unit 5 is stored into the row addresses R7 to R0 of the column address Ca0, respectively. In a manner similar to the above, each time the buffer writing request signal is received, the designated address by the write pointer control means 5-1a is increased and advances to the column address Ca4991. The 8-bit exposing energy value is stored into the whole (a) area. In this instance, a reading permission signal is sent from the buffer writing control portion 5-1 to the buffer reading control portion 5-2.

Subsequently, the write pointer control means 5-1a designates the column address Cb0 in the (b) area. In a manner similar to the above, the designated address by the write pointer control means 5-1a is increased and advances to the column address Cb4991. The 8-bit exposing energy value is stored into the whole (b) area. In this instance, the reading permission signal is sent from the buffer writing control portion 5-1 to the buffer reading control portion 5-2.

When the buffer reading control portion 5-2 receives the reading permission signal, the reading is started. The read pointer control means 5-2a designates the row address R7 in the (a) area under the control of the buffer reading control portion 5-2 (FIG. 7). At this time, the exposing energy values corresponding to one scanning line which have been stored in the row address R7 in the (a) area are sequentially read out and outputted as binary head data to the LED head control unit 8. Subsequently, when a line sync signal is inputted to the buffer control unit 6, the designated address by the read pointer control means 5-2a is increased by one. At this time, the exposing energy values corresponding to one scanning line which have been stored in the row address R6 in the (a) area are sequentially read out and outputted as binary head data to the LED head control unit 8. In a manner similar to the above, all of the exposing energy values in up to the row address R8 are read out and outputted as binary head data to the LED head control unit 8.

Returning to FIG. 1, the LED head control unit 8 is a portion for sending the binary head data received from the buffer control unit 6 to the LED head 9 in accordance with a predetermined time chart.

Figure 9:
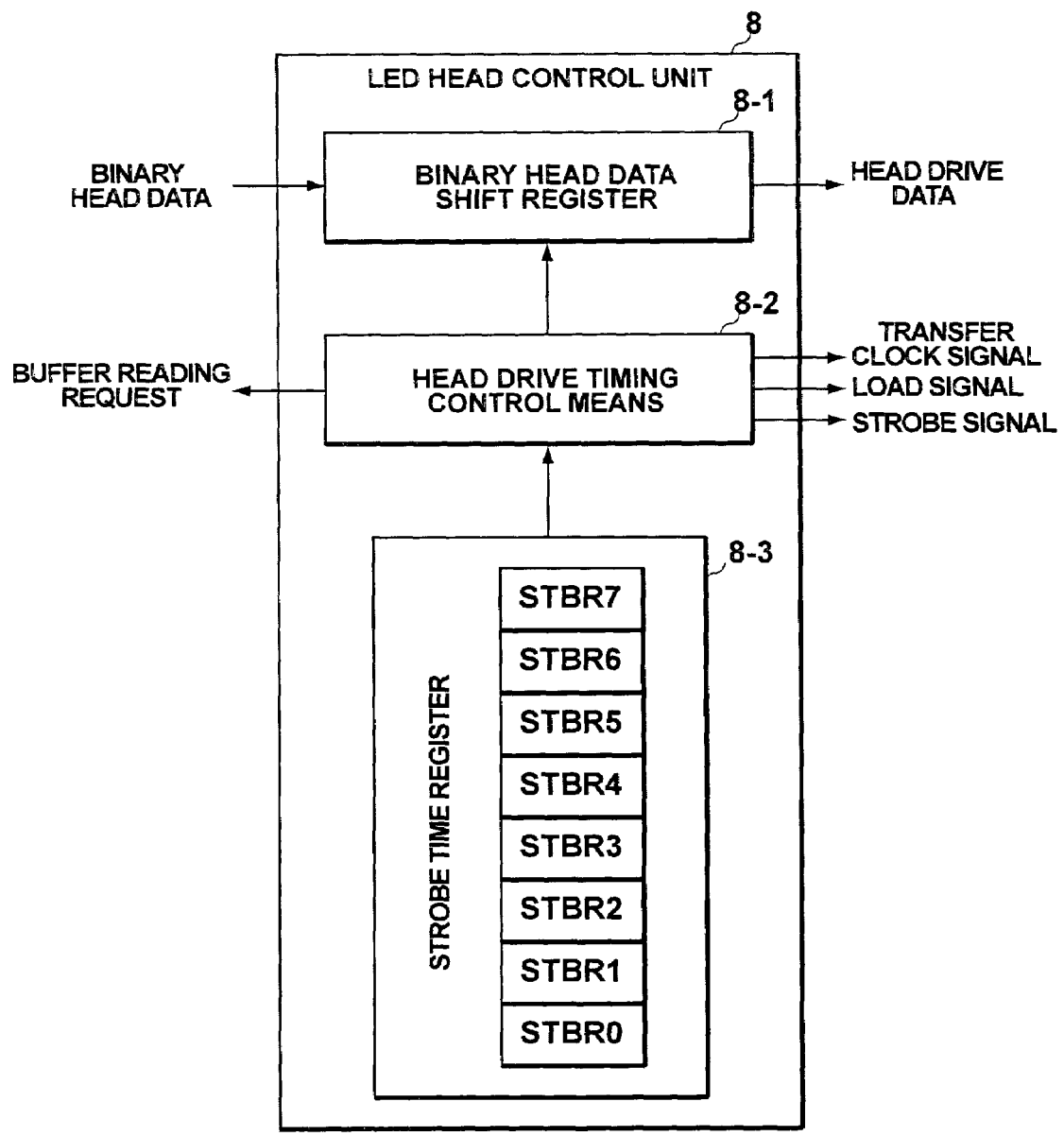
FIG. 9 is a block diagram of a construction of an LED head control unit.

FIG. 9 is a block diagram of a construction of the LED head control unit.

As shown in the diagram, the LED head control unit 8 has a binary head data shift register 8-1, head drive timing control means 8-2, and a strobe time register 8-3.

The binary head data shift register 8-1 is a portion for receiving the binary head data from the buffer control unit 6 (FIG. 1) and holding it.

The head drive timing control means 8-2 is means for outputting head drive data from the binary head data shift register 8-1 to the LED head on the basis of predetermined timing (which will be explained hereinafter). The head drive timing control means 8-2 is also means for outputting the transfer clock which is necessary for data transfer, the load signal, and the strobe signal.

The strobe time register 8-3 is a table for setting an exposing time corresponding to the bit position. That is, set values which have previously been stored in STBR7 to STBR0 correspond to, for example, strobe times of every scanning line which have been stored in the row addresses R7 to R0 in FIG. 8.

Figure 10:
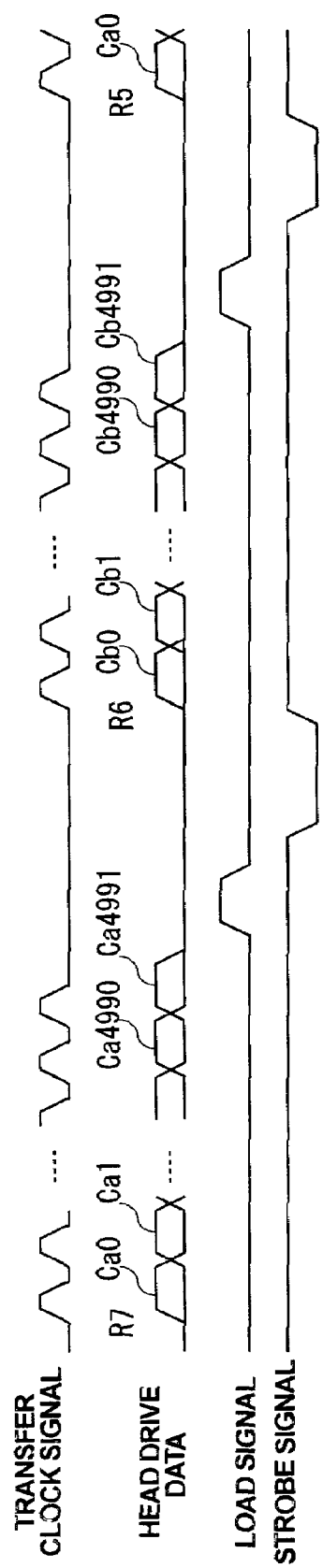
FIG. 10 is a time chart (Part 1) for explaining the operation of the LED head control unit.

FIG. 10 is a time chart (Part 1) for explaining the operation of the LED head control unit.

In the direction of an axis of ordinate in the diagram, the transfer clock signal, head drive data, load signal, and strobe signal are shown in order from the top. An axis of abscissa in the diagram indicates a time base which is common to those signals.

As shown in the diagram, the LED head control unit (FIG. 9) transfers the head drive data corresponding to one scanning line (Ca0 to Ca4991) to the LED head 9 (FIG. 1) synchronously with the transfer clock signal. After completion of the transfer of the head drive data of one scanning line, the LED head control unit (FIG. 9) sends the load signal to the LED head 9 (FIG. 1) and, subsequently, sends the strobe signal for the time set in STBR7 in the strobe time register 8-3, thereby exposing.

Figure 11:
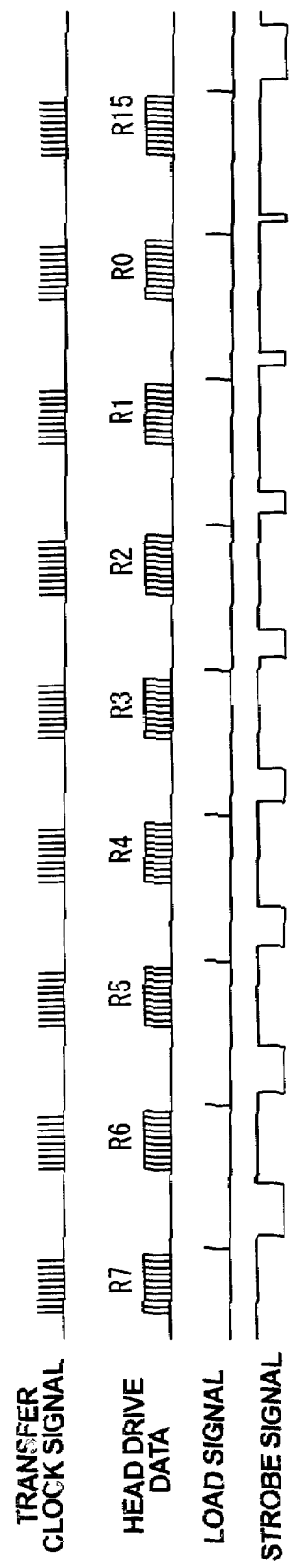
FIG. 11 is a time chart (Part 2) for explaining the operation of the LED head control unit.

FIG. 11 is a time chart (Part 2) for explaining the operation of the LED head control unit.

This diagram is a time chart which covers FIG. 10 for a long time.

In the direction of an axis of ordinate in the diagram, the transfer clock signal, head drive data, load signal, and strobe signal are shown in order from the top. An axis of abscissa in the diagram indicates a time base which is common to those signals.

As shown in the diagram, the strobe time differs every scanning line (head drive data). Weights of the strobe times are values which have been set by STBR0 to STBR0 in the strobe time register. It will be understood that pulse widths of the eight kinds of strobe signals are outputted in correspondence to the row addresses in the energy data line buffer (FIG. 8) as mentioned above.

Returning to FIG. 1, the LED head 9 receives the head drive data controlled as mentioned above from the LED head control unit 8, forms an electrostatic latent image onto a photosensitive member (not shown), and obtains a desired output image.

As described above, in the embodiment, as noises which are added to the image data outputted every recording device, by using the uniform distribution random number noises in which a predetermined bias value is added to the noise level and the noise level has been center-distributed around 0 as a center, the average concentration of the noises which are added approaches 0. Consequently, such an effect that the slight image change which has occurred in the related art does not occur is obtained.

Embodiment 2

Figure 12:
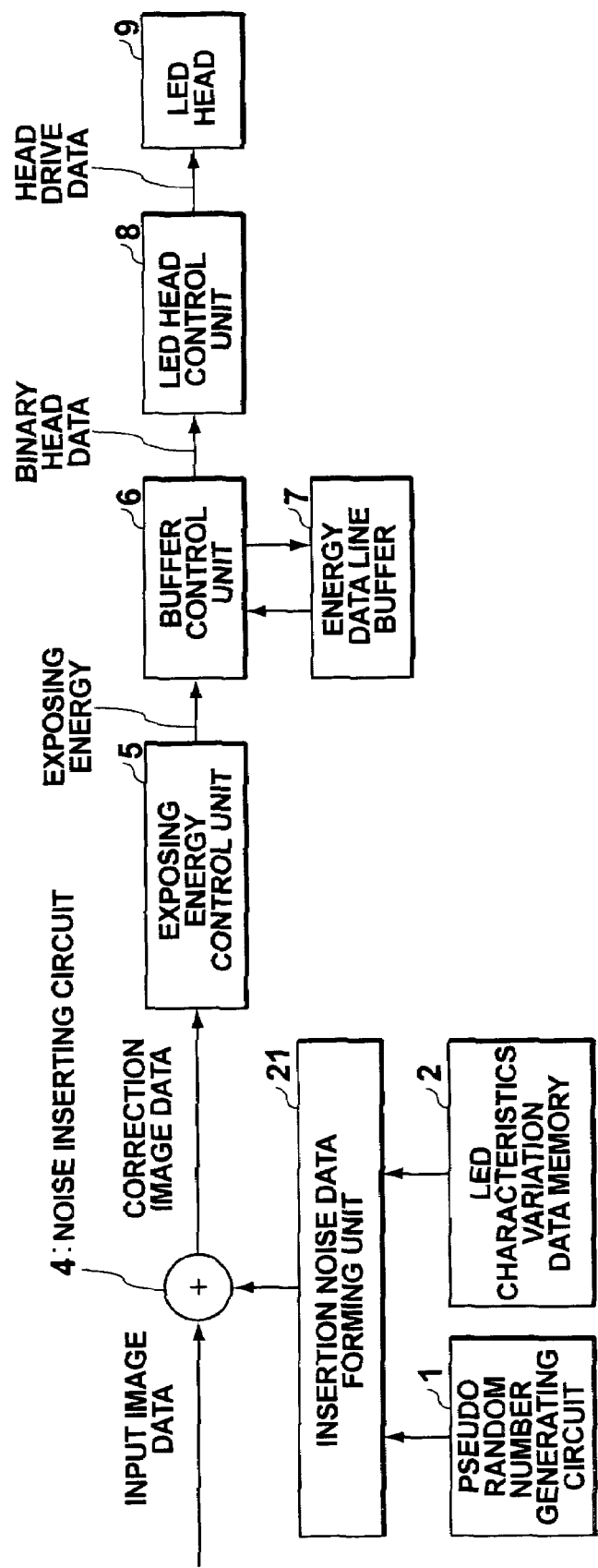
FIG. 12 is a block diagram of a construction of an image forming apparatus according to an embodiment 2.

FIG. 12 is a block diagram of a construction of an image forming apparatus according to an embodiment 2.

As shown in the diagram, an image forming apparatus 200 according to the embodiment 2 has: the pseudo random number generating circuit 1; the LED characteristics variation data memory 2; an insertion noise data forming unit 21; the noise inserting circuit 4; the exposing energy control unit 5; the buffer control unit 6; the energy data line buffer 7; the LED head control unit 8; and the LED head 9. Only portions different from those in the embodiment 1 will be described hereinbelow. Portions similar to those in the embodiment 1 are designated by the same reference numerals or characters and their explanation is omitted.

The insertion noise data forming unit 21 is a portion for receiving the output of the pseudo random number generating circuit 1, reading out the correction values from the LED characteristics variation data memory 2, and forming the insertion noise data to be inserted into the input image data. Contents of such an operation will be described in detail hereinbelow.

FIGS. 13A to 13D are explanatory diagrams of functions of the insertion noise data forming unit in the embodiment 2.

Figure 13:
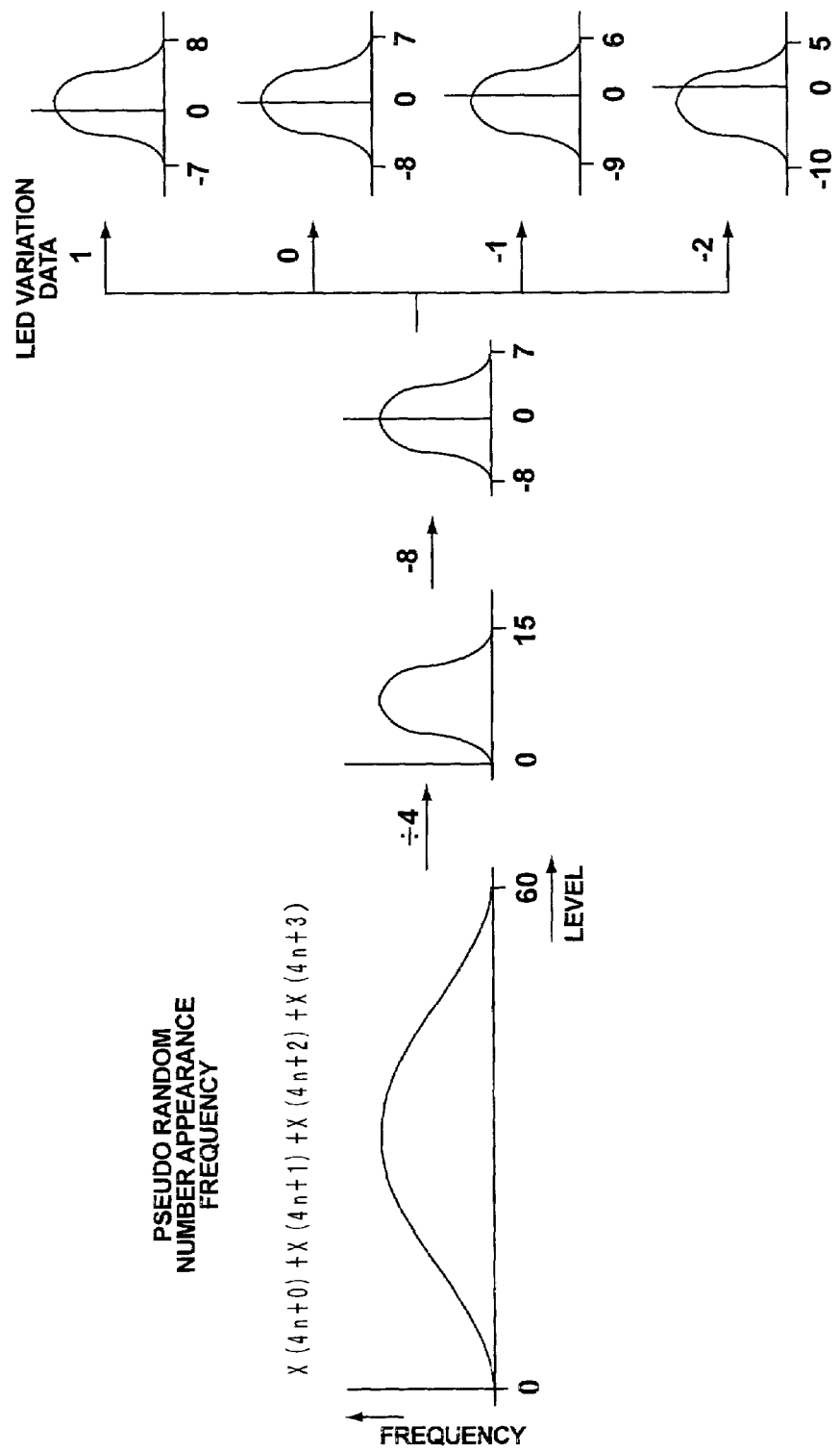
FIGS. 13A to 13D are explanatory diagrams of functions of an insertion noise data forming unit in the embodiment 2.

FIG. 13A shows a relation between the noise level and the appearance frequency of the pseudo random numbers received by the insertion noise data forming unit. FIG. 13B shows the state where the noise level in FIG. 13A has been divided by 4. FIG. 13C shows the state where the bias of −8 has been added to the noise level in FIG. 13B. FIG. 13D shows the state where the noise level has been corrected in accordance with the variation of the LED devices.

As shown in FIG. 13A, the insertion noise data forming unit 21 receives the output of the pseudo random number generating circuit 1 (FIG. 12) as a sum of the pseudo random numbers of four bits and four words which are expressed by $X(4n+0)+X(4n+1)+X(4n+2)+X(4n+3)$. Since the pseudo random number generating circuit is an M series pseudo random number generating circuit, its appearance frequency is expressed as normal distribution (normal random numbers) for the available level values 0 to 60 on an axis of abscissa. The distribution state of FIG. 13B is obtained by dividing the available values in the distribution state of FIG. 13A by 4. Further, the distribution state of FIG. 13C is obtained by adding the bias of −8 to the axis of abscissa in the distribution state of FIG. 13B.

Assuming that there is no variation of the LED devices, if the random number noises shown in FIG. 13C are inserted as they are into the input image data, the average level of the random number noises is equal to 0 every predetermined period. Therefore, the difference between the average concentration of every scanning line (which may be replaced by a plurality of scanning lines) only by the input image data and an average concentration of the scanning line (which may be replaced by a plurality of scanning lines) in the case where the random number noises have been inserted ought to be able to be ignored. That is, the state where the image is slightly changed ought not to occur.

However, there is actually the characteristics variation of the LED devices. The characteristics variation becomes the variation of the light emitting energies and breaks the foregoing ideal state. Thus, it is necessary to correct the characteristics variation of the LED devices. As a method of correcting such a variation, for example, the variation level of all of the LED devices is divided into four levels (1, 0, −1, −2) in order to correct the variation. The state where the bias has been corrected every divided level in order to apply the bias to the level-divided LEDs becomes the appearance frequency shown in FIG. 13D. That is, the random number noises of the appearance frequency shown in FIG. 13D are selected in accordance with each level (in accordance with the characteristics variation) and inserted to each of the level-divided LED devices. Thus, the correction of the output light energies of the input image data is executed every LED device. The difference between the average concentration of every scanning line (which may be replaced by a plurality of scanning lines) only by the input image data and the average concentration of the scanning line (which may be replaced by a plurality of scanning lines) in the case where the random number noises have been inserted can be ignored.

Figure 14:
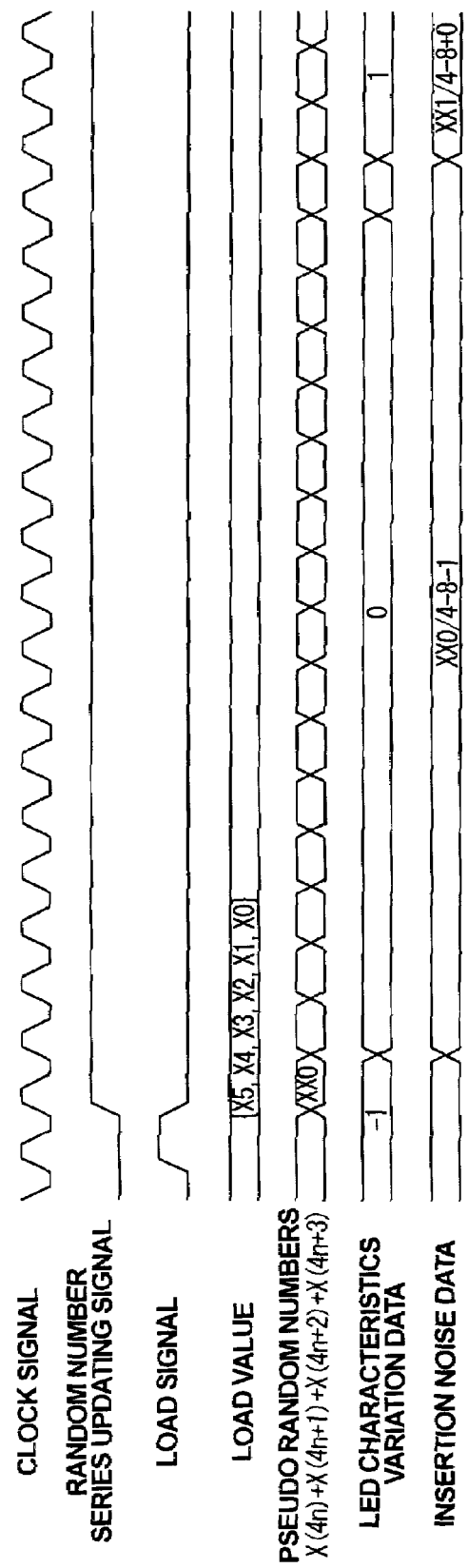
FIG. 14 is an explanatory diagram of the operation of the insertion noise data forming unit in the embodiment 2.

FIG. 14 is an explanatory diagram of the operation of the insertion noise data forming unit in the embodiment 2.

In the direction of an axis of ordinate in the diagram, the clock signal, the random number series updating signal, the load signal, the load value, the pseudo random numbers Xn, the LED characteristics variation data, and the insertion noise data are shown in order from the top. An axis of abscissa in the diagram indicates the time base which is common to those signals. In the diagram, for the period of time during which the random number series updating signal has been asserted, the valid pseudo random numbers are received every 16 clocks from the pseudo random number generating circuit (FIG. 2). The pseudo random numbers XXn are inputted to the subtractor 3-1 in FIG. 4.

As shown in the diagram, the LED characteristics variation data is inputted every 16 bits to the adder 3-2 (FIG. 4) synchronously with the pseudo random numbers XXn in order of level −1, level 0, level 1, and level 1 and, at the same time, the insertion noise data (XX0/4−8−1, XX1/4−8+0, XX2/4−8+1, XX3/4−8+1) is outputted.

As described above, in the embodiment 2, it will be understood that an effect similar to that in the embodiment 1 can be obtained by providing the insertion noise data forming unit based on the normal distribution random numbers in place of the uniform distribution random numbers in the embodiment 1.

Embodiment 3

Figure 15:
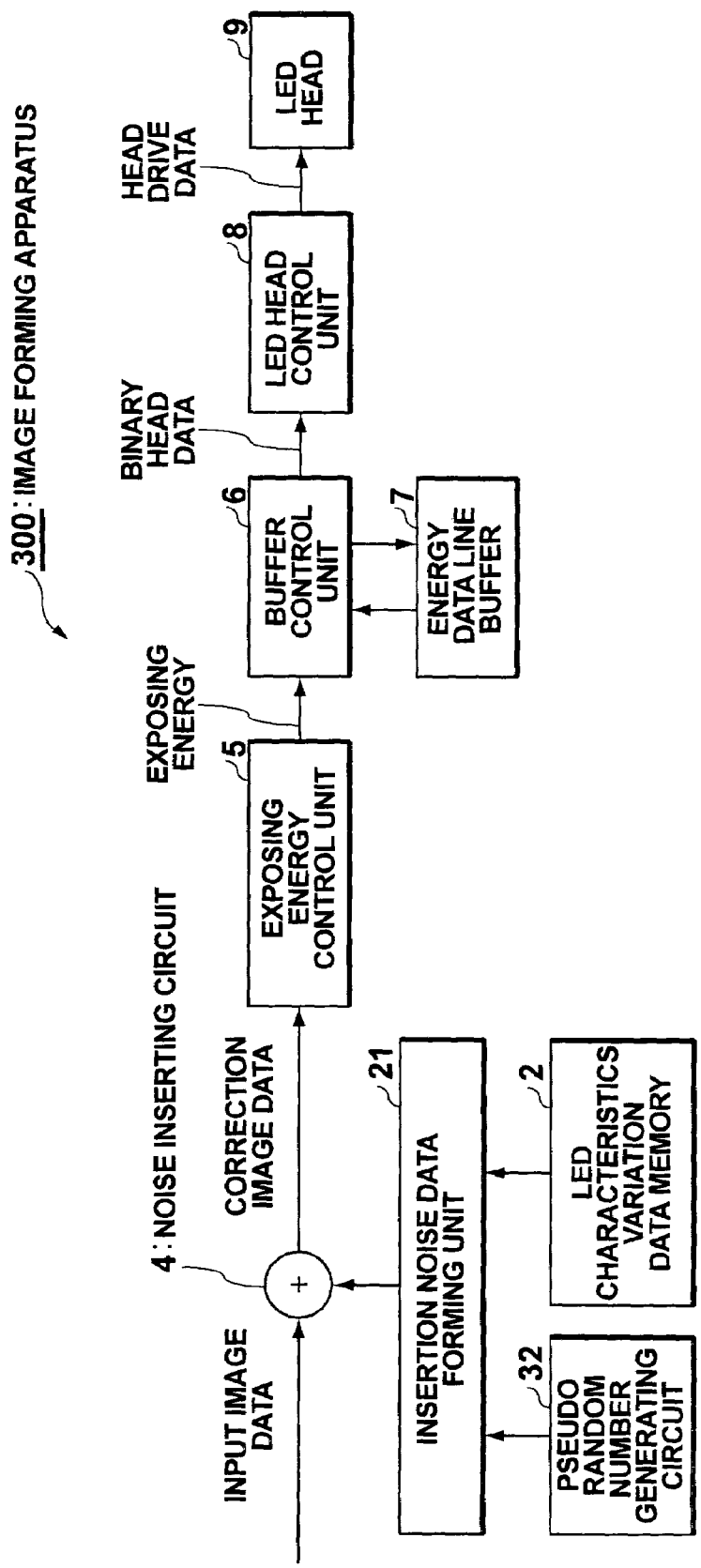
FIG. 15 is a block diagram of a construction of an image forming apparatus according to an embodiment 3.

FIG. 15 is a block diagram of a construction of an image forming apparatus according to an embodiment 3.

As shown in the diagram, an image forming apparatus 300 according to the embodiment 3 has: a pseudo random number generating circuit 32; the LED characteristics variation data memory 2; the insertion noise data forming unit 21; the noise inserting circuit 4; the exposing energy control unit 5; the buffer control unit 6; the energy data line buffer 7; the LED head control unit 8; and the LED head 9. Only portions different from those in the embodiment 1 or 2 will be described hereinbelow. Portions similar to those in the embodiment 1 or 2 are designated by the same reference numerals or characters and their explanation is omitted.

The pseudo random number generating circuit 32 is a circuit for forming noises which are inserted into the input image data which is transmitted from the upper apparatus (not shown).

Figure 16:
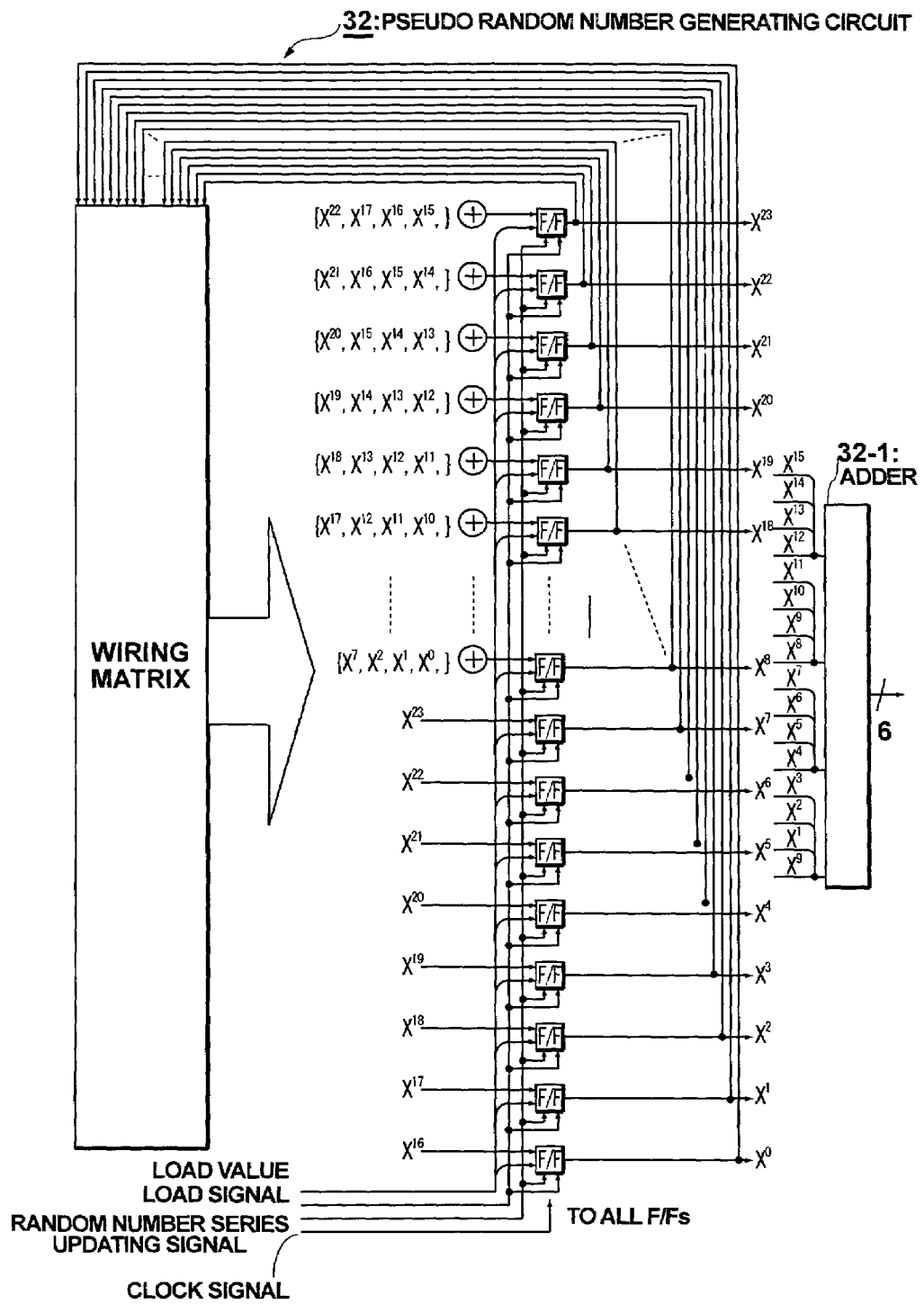
FIG. 16 is a constructional diagram of a pseudo random number generating circuit in the embodiment 3.

FIG. 16 is a constructional diagram of the pseudo random number generating circuit in the embodiment 3.

As shown in the diagram, the pseudo random number generating circuit 32 in the embodiment is a circuit obtained by raising a processing speed of the pseudo random number generating circuit 1 (FIG. 2) which is used in the embodiment 1 or 2. The pseudo random number generating circuit 32 is constructed so that a status transition of 16 shift clocks of a linear feedback shift register which is expressed by a characteristics polynomial $$X^{24}=1+X+X^2+X^7$$

is realized by one clock. Further, pseudo random number outputs of four bits and four words of {X3, X2, X1, X0}, {X7, X6, X5, X4}, {X11, X10, X9, X8}, and {X15, X14, X13, X12} of this circuit are added by an adder 32-1, and the pseudo random numbers XXn of 6 bits and one word which are newly obtained from the sum of those outputs are outputted. The pseudo random numbers XXn of 6 bits and one word are sent to the insertion noise data forming unit 21. Since their available values are equal to 0 to 60 (because of 4 bits and 4 words), the subsequent processes are executed in a manner similar to those in the embodiment 2.

Figure 17:
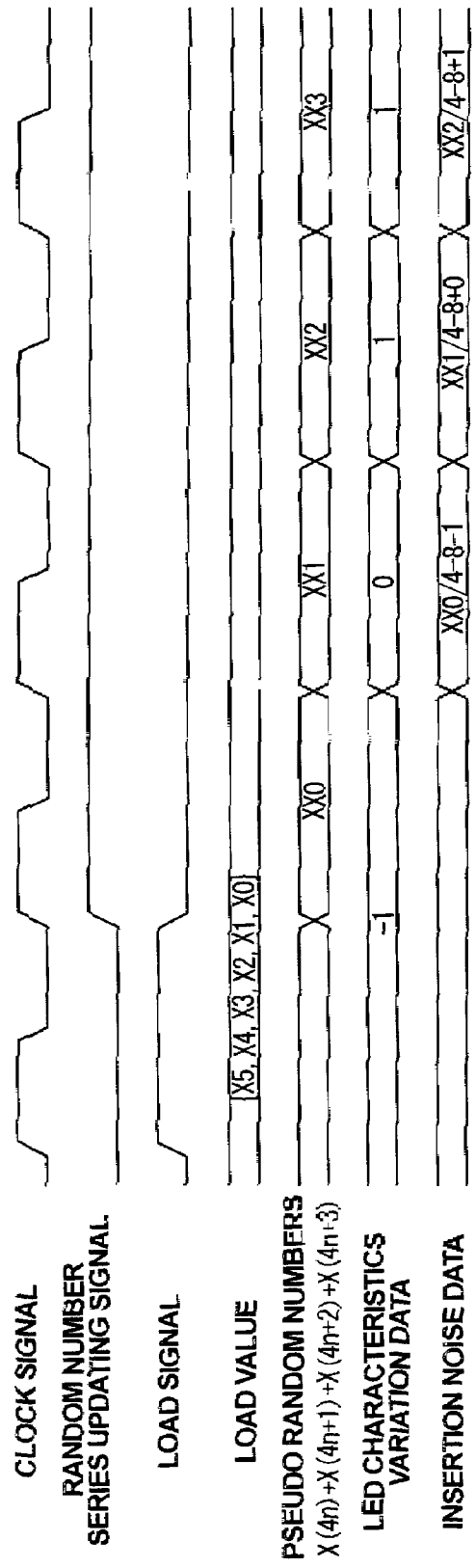
FIG. 17 is an explanatory diagram of the operation of an insertion noise data forming unit in the embodiment 3.

FIG. 17 is an explanatory diagram of the operation of the insertion noise data forming unit in the embodiment 3.

In the direction of an axis of ordinate in the diagram, the clock signal, the random number series updating signal, the load signal, the load value, the pseudo random numbers Xn, the LED characteristics variation data, and the insertion noise data are shown in order from the top. An axis of abscissa in the diagram indicates the time base which is common to those signals. In the diagram, for the period of time during which the random number series updating signal has been asserted, the valid pseudo random numbers are outputted every clock from the pseudo random number generating circuit (FIG. 16). The pseudo random numbers XXn are inputted to the insertion noise data forming unit 21 in FIG. 15.

As shown in the diagram, the LED characteristics variation data is inputted every bit to the insertion noise data forming unit 21 in order of level −1, level 0, level 1, and level 1 synchronously with the pseudo random numbers XXn and, at the same time, insertion noise data (XX0/4−8−1, XX1/4−8+0, XX2/4−8+1, XX3/4−8+1) is outputted. Subsequently, the operation similar to that in the embodiment 2 is executed.

As described above, in the embodiment 3, by raising the processing speed of the pseudo random number generating circuit 1 (FIG. 2) which is used in the embodiment 2, in addition to the effect in the embodiment 2, such an effect that the processing speed of the image data becomes high is obtained.

Although the embodiments have been described above with respect to the cases where the invention is applied to the printer, the invention is not limited to such examples. That is, the invention can be also applied to a facsimile apparatus, a copying apparatus, a multi function printer, and the like.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus for making output correction of a plurality of recording devices arranged on at least one scanning line with respect to an input image signal, comprising:
    a correction amount calculating unit which calculates a correction amount using a predetermined value as a reference, said predetermined value being 0;
    a correction amount inserting unit which arithmetically combines the correction amount calculated by said correction amount calculating unit and said input image signal; and
    a series forming unit which forms series numbers by using said predetermined value as said reference,
    wherein said series numbers are pseudo random numbers.

2. The image forming apparatus according to claim 1, wherein said correction amount is a value obtained by averaging the series numbers formed by said series forming unit.

3. The image forming apparatus according to claim 1, wherein said pseudo random numbers are uniform distribution random numbers or normal distribution random numbers.

4. The image forming apparatus according to claim 3, further comprising center distributing means which receives said pseudo random numbers, arithmetically combines a predetermined bias value and said pseudo random numbers, center-distributes said pseudo random numbers around 0 as a center, and outputs them.

5. The image forming apparatus according to claim 4, further comprising variation correcting means which makes correction of said bias value to the center-distributed pseudo random numbers which are outputted by said center distributing means on the basis of an output correction value of each of said recording devices.

6. The image forming apparatus according to claim 1, further comprising output speed raising means which synthesizes an output of said pseudo random numbers into a plurality of bits and a plurality of words and outputs them.

7. The image forming apparatus according to claim 1, further comprising exposing means as image forming means, said exposing means including said recording devices.

8. The image forming apparatus according to claim 7, wherein said recording devices are LED devices.

9. An image forming apparatus, comprising:
a plurality of recording elements which are arranged on at least one scanning line;
an inputting section which inputs an input image signal;
a pseudo random number generating section which generates pseudo random numbers; and
an inserting section which inserts the pseudo random numbers into the input image signal for correcting outputs of said recording elements,
wherein an average value of the pseudo random numbers inserted into the input image signal is set within a predetermined range, zero being included within the predetermined range.

10. The image forming apparatus according to claim 9, wherein said pseudo random numbers are uniform distribution random numbers or normal distribution random numbers.

11. The image forming apparatus according to claim 10, further comprising center distributing means which receives said pseudo random numbers, arithmetically combines a predetermined bias value and said pseudo random numbers, center-distributes said pseudo random numbers around 0 as a center, and outputs them.

12. The image forming apparatus according to claim 11, further comprising variation correcting means which makes correction of said bias value to the center-distributed pseudo random numbers which are outputted by said center distributing means on the basis of an output correction value of each of said recording elements.

13. The image forming apparatus according to claim 12, further comprising exposing means as image forming means, said exposing means including said recording elements.

14. The image forming apparatus according to claim 13, wherein said recording elements are LEDs.

15. The image forming apparatus according to claim 9, further comprising output speed raising means which synthesizes an output of said pseudo random numbers into a plurality of bits and a plurality of words and outputs them.

16. An image forming apparatus, comprising:
an LED head having a plurality of LEDs; and
drive means for driving the LED head in response to input image data, the drive means including correction means for compensating for variations in light-emitting responsiveness of the LEDs,
wherein the correction means comprises
means for storing LED characteristics variation data,
means for generating pseudo random numbers that lie within a pseudo random number range having a maximum value and a minimum value,
means for generating correction data by arithmetically combining the psuedo random numbers, the LED characteristics variation data, and a predetermined bias value that is larger than the minimum value of the pseudo random number range and smaller than the maximum value of the pseudo random number range, and
means for adjusting the input image data in accordance with the correction data.

17. The image forming apparatus of claim 16, wherein the maximum value of the pseudo random number range and the minimum value of the pseudo random number range have an average value, and the predetermined bias value is the average value.

* * * * *